United States Patent
Hou et al.

(10) Patent No.: US 11,294,227 B2
(45) Date of Patent: Apr. 5, 2022

(54) DISPLAY DEVICE

(71) Applicant: WUHAN CHINA STAR OPTOELECTRONICS TECHNOLOGY CO., LTD., Hubei (CN)

(72) Inventors: Shaojun Hou, Hubei (CN); Xindong Mei, Hubei (CN); Chao Wang, Hubei (CN); Guanghui Liu, Hubei (CN); Zhifu Li, Hubei (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 153 days.

(21) Appl. No.: 16/764,292

(22) PCT Filed: Feb. 28, 2020

(86) PCT No.: PCT/CN2020/077166
§ 371 (c)(1),
(2) Date: May 14, 2020

(87) PCT Pub. No.: WO2021/159561
PCT Pub. Date: Aug. 19, 2021

(65) Prior Publication Data
US 2021/0405448 A1    Dec. 30, 2021

(30) Foreign Application Priority Data

Feb. 12, 2020 (CN) .................. 202010088443.6

(51) Int. Cl.
*G02F 1/13357* (2006.01)
*G02F 1/1335* (2006.01)

(52) U.S. Cl.
CPC .. *G02F 1/133603* (2013.01); *G02F 1/133512* (2013.01); *G02F 1/133514* (2013.01); *G02F 1/133531* (2021.01)

(58) Field of Classification Search
CPC ................................................ G02F 1/133603
See application file for complete search history.

(56) References Cited

U.S. PATENT DOCUMENTS

2019/0331960 A1*  10/2019  Li ................. G02F 1/13318
2021/0294015 A1*   9/2021  Yin ............... G02F 1/13312

FOREIGN PATENT DOCUMENTS

| CN | 108594524 A | 9/2018 |
| CN | 108957849 A | 12/2018 |
| CN | 110190097 A | 8/2019 |
| CN | 110231735 A | 9/2019 |
| CN | 110275340 A | 9/2019 |
| CN | 110515237 A | 11/2019 |
| CN | 110703499 A | 1/2020 |

* cited by examiner

*Primary Examiner* — Edmond C Lau (57) ABSTRACT

A display device is provided to include a backlight module and a display module disposed on the backlight module. The backlight module is provided with a first via hole, and a lighting member is disposed in the first via hole, and a maximum cross-section of the first via hole corresponds to a lighting area of the display device. A first light source and a light guide member are further disposed in the lighting area, and the first light source and the light guide member surround the lighting member.

14 Claims, 6 Drawing Sheets

DISPLAY DEVICE

BACKGROUND OF INVENTION

Field of Invention

The present invention relates to the field of display technology, and more particularly, to a display device.

Description of Prior Art

With continuous development of display technology, display devices, such as mobile phones, tablet computers etc., screens with a high screen ratio have become more popular. Due to lighting requirements of some functional devices in the display devices, such as cameras, light sensors, etc., it is difficult for the screen of the display device to achieve the optimal screen ratio.

Currently, technologies that achieve high screen ratios mainly include narrowing frames and adopting bangs screens, waterdrop screens, or digging screens, which sacrifices a part of the screen space and directly exposes the lighting devices to the screen, and does not achieve a true full-screen. Currently, the technologies also adopt a full screen using a lifting camera or a sliding cover, but these all require additional module structure or increase equipment thickness, and the cost is relatively high. Therefore, it needs to improve the technical problems.

SUMMARY OF INVENTION

A display device is provided. It is used to solve the technical problems that the display devices in the prior art sacrifice a part of the screen space or additionally increase the module structure, resulting in higher production costs and lower user experience due to increasing product thickness.

A display device comprises a backlight module; and a display module disposed on the backlight module. The backlight module is provided with a first via hole, and a lighting member is disposed in the first via hole, and a maximum cross-section of the first via hole corresponds to a lighting area of the display device. A first light source and a light guide member are further disposed in the lighting area, and the first light source and the light guide member surround the lighting member. When the lighting member is not working, the first light source is on; when the lighting member is working, the first light source is off; and a transmittance of the lighting area of the display device is greater than a transmittance of the non-lighting area of the display device.

In one embodiment, the display module comprises a display panel and an upper polarizer and a lower polarizer disposed on both sides of the display panel, the display panel comprises an array substrate and a color filter substrate, the array substrate is opposite to a color filter substrate, and a liquid crystal layer is disposed between the array substrate and the color filter substrate.

In one embodiment, a width of metal trace of the array substrate corresponding to the lighting area is less than a width of metal trace of the array substrate corresponding to the non-lighting area.

In one embodiment, a space of metal trace of the array substrate corresponding to the lighting area is greater than a space of metal trace of the array substrate corresponding to the non-lighting area.

In one embodiment, a width of black matrix of the array substrate corresponding to the lighting area is less than a width of black matrix of the array substrate corresponding to the non-lighting area.

In one embodiment, a space of black matrix of the array substrate corresponding to the lighting area is greater than a space of black matrix of the array substrate corresponding to the non-lighting area.

In one embodiment, a distribution density of the thin film transistors of the array substrate corresponding to the lighting area is less than a distribution density of the thin film transistors of the array substrate corresponding to the non-lighting area.

In one embodiment, a distribution density of the color resist of the color filter substrate corresponding to the lighting area is less than a distribution density of the color resist of the color filter substrate corresponding to the non-lighting area.

In one embodiment, a distribution density of the thin film transistors of the array substrate corresponding to the lighting area is equal to a distribution density of the thin film transistors of the array substrate corresponding to the non-lighting area.

In one embodiment, a distribution density of the color resist of the color filter substrate corresponding to the lighting area is a half or a quarter of a distribution density of the color resist of the color filter substrate corresponding to the non-lighting area.

In one embodiment, the color filter substrate corresponding to the lighting area does not have a color resist, and a first light source is consisted of a red mini light emitting diode (LED), a green mini LED, and a blue mini LED.

In one embodiment, the backlight module comprises an optical film group and a second light source disposed on the optical film group, the second light source is located in the non-lighting area of the display device, the optical film group comprises a first optical film, a second optical film disposed on the first optical film, and a third optical film disposed on the second optical film.

In one embodiment, the second light source is a mini LED group, and the mini LED group is disposed between the first optical film and the second optical film.

In one embodiment, the second light source is an LED light bar group, and the LED light bar group is disposed on a side of the first optical film away from the lighting member, and a blocking layer is disposed between the optical film group and the light guide member.

The present invention has beneficial effects that the lighting device is disposed below the display module, and the display device includes into a lighting area and a non-lighting area according to the corresponding position of the lighting device. When the lighting member is not working, no lighting is required, and the full screen of the display device is displayed normally. The lighting area is transformed into a high-transmittance state to allow light to pass through so as to achieve lighting. Therefore, the lighting member is working normally, so it achieves a true full-screen display.

DETAILED DESCRIPTION OF PREFERRED EMBODIMENTS

In order to make the purpose, technical solution, and effect of the present invention more clear and definite, the present invention is further described in detail below with reference to the accompanying drawings and examples. It should be understood that the specific embodiments described herein are only used to explain the present invention, and are not used to limit herein.

Figure 1:
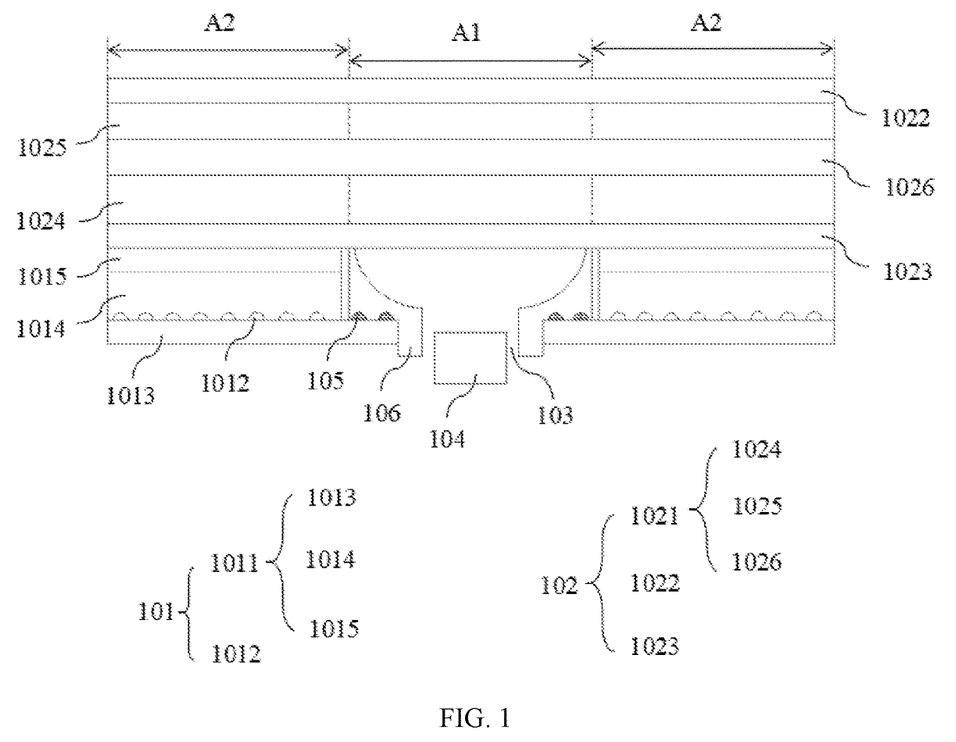
FIG. 1 is a schematic structural view of a display device according to one embodiment of the present invention.

Referring to FIG. 1, it is a schematic structural view of a display device according to one embodiment of the present invention. From the figure, each component of the application and the relative positional relationship between the various components can be seen intuitively. The display device includes a backlight module 101 and a display module 102 disposed on the backlight module 101. The backlight module 101 is provided with a first via hole 103, and a lighting member 104 is disposed in the first via hole 103, and a maximum cross-section of the first via hole 103 corresponds to a lighting area A1 of the display device. A first light source 105 and a light guide member 106 are further disposed in the lighting area A1, and the first light source 105 and the light guide member 106 surround the lighting member 104. When the lighting member 104 is not working, the first light source 105 is on; when the lighting member 104 is working, the first light source 105 is off, and a transmittance of the lighting area A1 of the display device is greater than a transmittance of the non-lighting area A2 of the display device.

It should be noted that, the display device according to one embodiment of the present invention includes a lighting member 104 such as a camera, a light sensor, etc. disposed in the via hole by digging a hole in the backlight module 101, that is, lighting member 104 is disposed under the display module 102. When the lighting member 104 is not working, the first light source 105 is on, and the light emitted by the first light source 105 may be projected to the lighting area A1 corresponding to the display module 102 through the light guide member 106, and the full-screen of the display device may be normally displayed. When the lighting member 104 needs to light, the first light source 105 is off, and the liquid crystal direction is adjusted by controlling the voltage, so that the lighting area A1 is transformed into a high light transmission state, and the entire panel has a high light transmittance at this time. Since the first light source 105 is off, the light source of the display device does not affect the lighting member 104. At this time, external light may enter the lighting member 104 through the lighting area A1. Therefore, the lighting member 104 may work normally, so it achieves a true full-screen and solves the technical problems of the technology that requires digging the display panel to cause the screen ratio to reach less than 100%, and the cost increase caused by the use of a camera or slider.

It should be noted that, in the embodiment of the present invention, the backlight of the lighting area A1 is implemented by using the first light source 105 and the light guide member 106, such as a mini LED with a light guide structure or a film. The light guide member 106 is a transparent material, and the light emitted by the first light source 105 may be focused and uniformly transmitted under the lighting area A1 through a special optical structure design, so as to provide backlight for the lighting area.

It should be noted that the lighting member 104 according to the embodiment of the present invention may be disposed at any position below the screen as required. The area corresponding to the lighting member 104 is the lighting area A1 of the display device. The display module corresponding to the lighting area A1 also includes a TFT, a liquid crystal, a polarizer, and the like required to achieve normal display. The lighting area A1 and the non-lighting area A2 share the same type of liquid crystal and polarizer.

In one embodiment, the display module 102 includes a display panel 1021 and an upper polarizer 1022 and a lower polarizer 1023 disposed on both sides of the display panel 1021. The display panel 1021 includes an array substrate 1024 and a color filter substrate 1025, the array substrate 1024 is opposite to a color filter substrate 1025, and a liquid crystal layer 1026 is disposed between the array substrate 1024 and the color filter substrate 1025.

In one embodiment, a width of metal trace (not shown) of the array substrate 1024 corresponding to the lighting area A1 is less than a width of metal trace (not shown) of the array substrate 1024 corresponding to the non-lighting area A1. In this embodiment, the transmittance of the lighting area A1 may be improved by reducing the width of the opaque metal trace.

In one embodiment, a space of metal trace (not shown) of the array substrate 1024 corresponding to the lighting area A1 is greater than a space of metal trace (not shown) of the array substrate 1024 corresponding to the non-lighting area A2. In this embodiment, the transmittance of the lighting area A1 may be improved by increasing the space between the opaque metal traces.

In one embodiment, a width of black matrix (not shown) of the array substrate 1024 corresponding to the lighting area A1 is less than a width of black matrix (not shown) of the array substrate 1024 corresponding to the non-lighting area A2. In this embodiment, the transmittance of the lighting area A1 may be improved by reducing the width of the opaque black matrix.

In one embodiment, a space of black matrix (not shown) of the array substrate 1024 corresponding to the lighting area is greater than a space of black matrix (not shown) of the array substrate 1024 corresponding to the non-lighting area A2. In this embodiment, the transmittance of the lighting area A1 may be improved by increasing the space between the opaque black matrices.

In one embodiment, a distribution density of the thin film transistors (not shown) of the array substrate 1024 corresponding to the lighting area A1 is less than a distribution density of the thin film transistors (not shown) of the array substrate 1024 corresponding to the non-lighting area A2. In this embodiment, the transmittance of the lighting area A1 may be improved by appropriately reducing the number of thin film transistors, that is, appropriately reducing the PPI. It should be noted that the number of thin film transistors corresponding to the lighting area A1 on the array substrate 1024 is reduced, and the color resist on the color filter substrate 1025 is also reduced simultaneously.

In one embodiment, a distribution density of the color resist (not shown) of the color filter substrate 1025 corresponding to the lighting area A1 is less than a distribution density of the color resist (not shown) of the color filter substrate 1025 corresponding to the non-lighting area A2. In this embodiment, the transmittance of the lighting area A1 may be improved by reducing the color resist ratio of the color filter substrate 1025 corresponding to the lighting area A1.

It should be noted that the color resist of the color filter substrate 1025 corresponding to the lighting area A1 is reduced. At this time, the thin film transistors on the corresponding array substrate 1024 may not necessarily be reduced, that is, the number of thin film transistors on the corresponding array substrate 1024 may be unchanged. The position where the color resist is reduced still has a TFT, and its brightness and gray level (black and white display) may still be controlled separately. When the display device is displayed, this position may display various gray levels and brightness states. It is similar to RGBW display, and thus the brightness of the panel display is also increased.

In one embodiment, the color filter substrate 1025 corresponding to the lighting area A1 does not have a color resist, and a first light source 105 is consisted of a red mini light emitting diode (LED), a green mini LED, and a blue mini LED. In this embodiment, the transmittance of the lighting area A1 may be improved by removing the color resist of the color filter substrate 1025 corresponding to the lighting area A1.

It should be noted that the color resist of the color filter substrate 1025 corresponding to the lighting area A1 is completely removed. At this time, the transmittance of the color filter substrate 1025 may be greatly improved, and the overall light transmittance of the display device may be greatly improved. The color filter substrate 1025 corresponds to no color resist in the lighting area A1. At this time, the first light source 105 (backlight) is arranged in RGB three colors. By increasing the driving frequency of the display panel in the lighting area A1, the color display of the lighting area A1 may be realized by FSC during display.

It should be noted that FSC refers to a field sequential color liquid crystal display, which uses an inverter to drive the RGB backlight to illuminate in order. It makes the eyes produce afterimage effect and mix the three colors, just like the continuous illumination, and thus it improves the utilization ratio of the backlight source, increases the brightness of the display device, reduces the power consumption, and realizes full color display.

In one embodiment, the backlight module 101 includes an optical film group 1011 and a second light source 1012 disposed on the optical film group 1011. The second light source 1012 is located in the non-lighting area A2 of the display device, the optical film group 1011 includes a first optical film 1013, a second optical film 1014 disposed on the first optical film 1013, and a third optical film 1015 disposed on the second optical film 1014. It should be noted that the first optical film 1013, the second optical film 1014, and the third optical film 1015 respectively implement the functions of light reflection, light guiding, and light diffusion.

In one embodiment, the second light source 1012 is a mini LED group, and the mini LED group is disposed between the first optical film and the second optical film.

Figure 2:
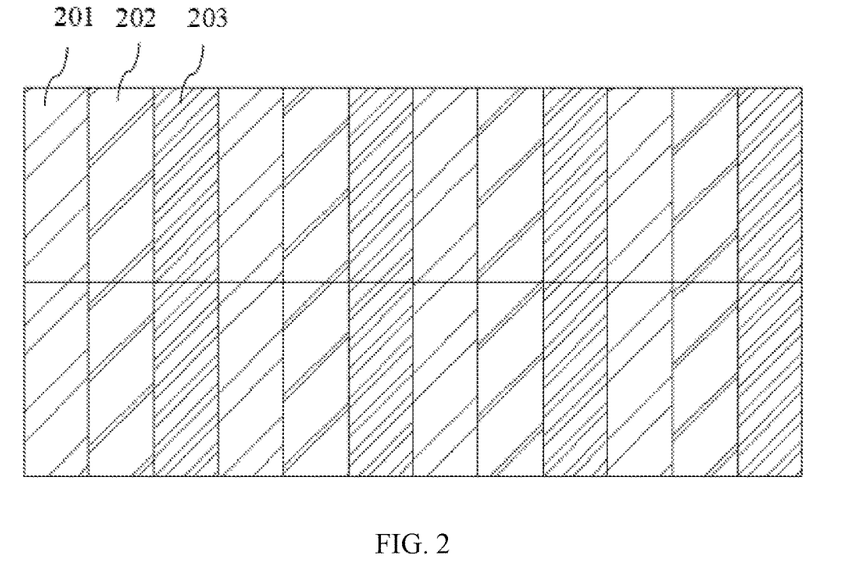
FIG. 2 is a schematic view of arrangement of color resist of a color film substrate corresponding to a non-lighting area according to one embodiment of the present invention.

Referring to FIG. 2, it is a schematic view of arrangement of color resist of a color film substrate corresponding to a non-lighting area according to one embodiment of the present invention. The color resist includes a red color resist 201, a green color resist 202, and a blue color resist 203. The color resists of the color filter substrate corresponding to the non-lighting area are arranged in stripes. The color in any row is cyclically arranged in the order of red, green, and blue. The color of color resist in any column is the same as the color resist directly above it. At this time, the transmittance of the color filter substrate corresponding to the non-lighting area is A %, and A is a constant value.

Figure 3A:
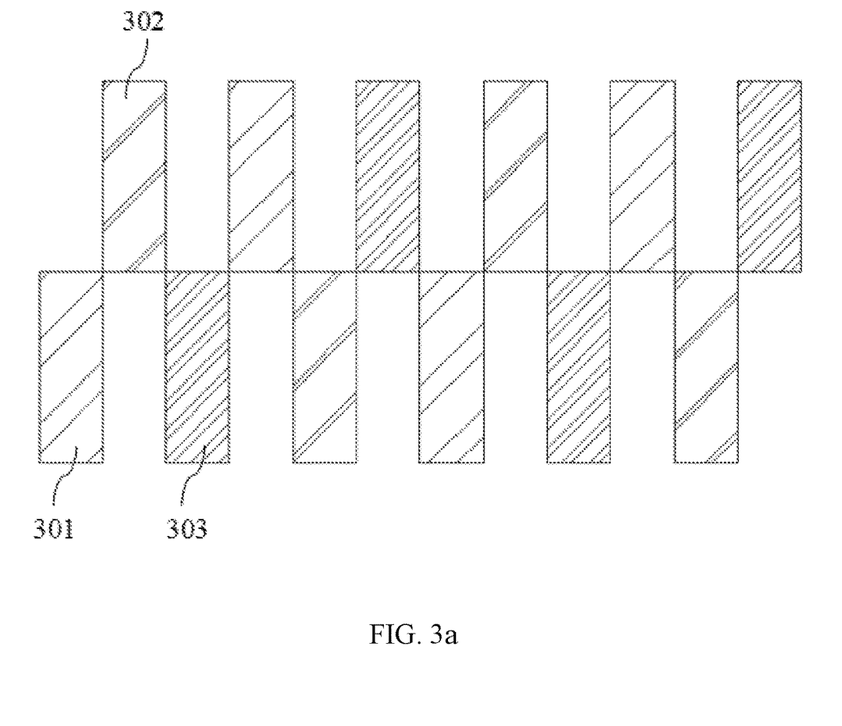
FIG. 3a is a schematic view of arrangement of color resist of a color film substrate corresponding to a lighting area according to one embodiment of the present invention.

Referring to FIG. 3a, it is a schematic view of arrangement of color resist of a color film substrate corresponding to a lighting area according to one embodiment of the present invention. The color resist includes a red color resist 301, a green color resist 302, and a blue color resist 303. The color resists of the color filter substrate corresponding to the lighting area are arranged in stripes. The color in any row is cyclically arranged in the order of green, red, and blue. There is a gap, which is equal to a width of a color resist, between color resists. The color of color resist in any column is the same as the color resist directly above it. There is a gap, which is equal to a height of a color resist, between the color resists. That is, a distribution density of the color resist of the color filter substrate corresponding to the lighting area is a half of distribution density of the color resist of the color filter substrate corresponding to the non-lighting area. At this time, the transmittance of the color filter substrate corresponding to the lighting area is A %,*50%+100%*(1-50%), and A is a constant value.

It should be noted that the color resist area accounts for 50% of the entire lighting area, and the other area excluding color resist area accounts for (1-50%) of the entire lighting area. Assuming that the brightness of the backlight is one unit, 50% of the light passes through the area with a transmittance rate of A %, and (1-50%) of the light passes through the area with a transmittance rate of 100%, which excludes color resists. Totally, A %*50%+100%*(1-50%) is the brightness that all lights pass through, and the transmitted brightness/original brightness (1 unit) is the overall transmittance.

Specifically, if A is 70, the transmittance corresponding to the non-lighting area is 70%, and the transmittance corresponding to the lighting area is 70%*50%+100%*(1-50%) is 85%, that is to say the overall transmittance of the device is greatly improved.

Figure 3B:
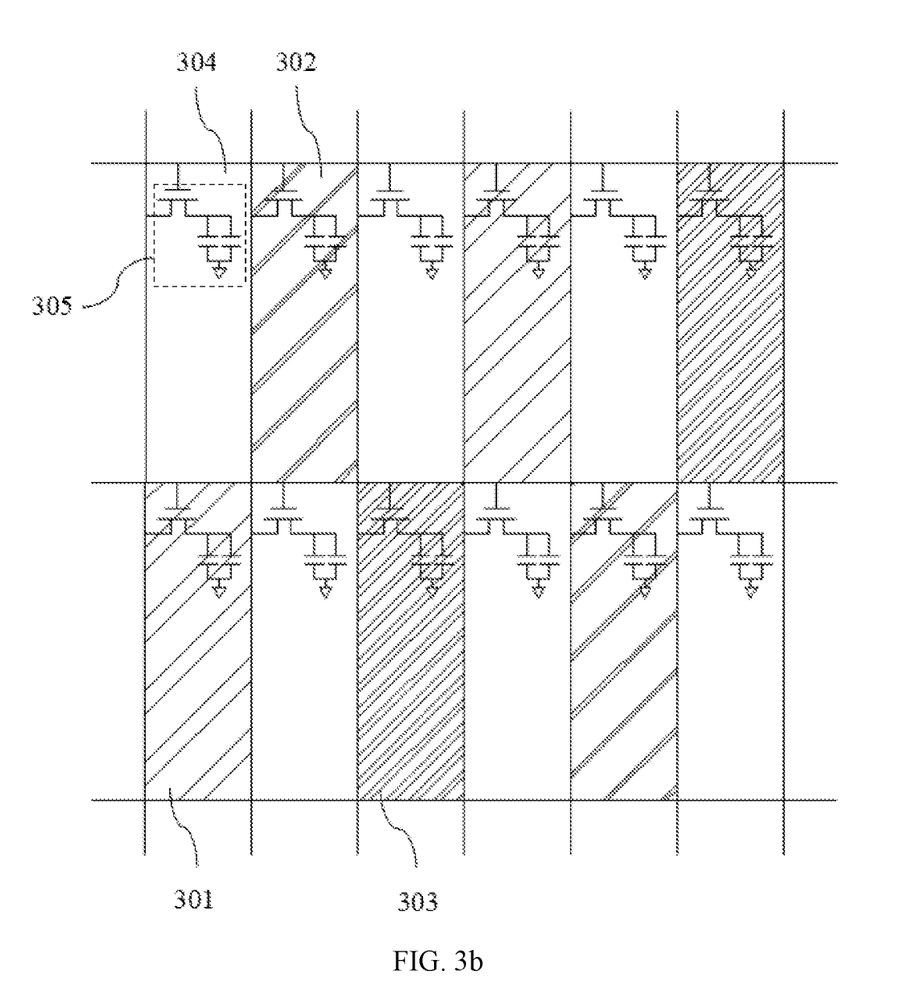
FIG. 3b is a schematic view of a part of a display panel corresponding to a lighting area according to first embodiment of the present invention.

Referring to FIG. 3b, it is a schematic view of a part of a display panel corresponding to a lighting area according to first embodiment of the present invention. The display panel includes an array substrate and a color filter substrate. The color resist arrangement of the color filter substrate corresponding to the lighting area is the same as that of FIG. 3a, that is, half of the color resist is removed. The area 304 excluding color resist corresponds to the TFT device 305 on the array substrate is still retained. At this time, the area 304 excluding color resist may still control its brightness and gray level (black and white display) separately. When the lighting member is not working (ie, normal display), this area 304 may display various gray levels and brightness states, which is similar to RGBW display. When the lighting member is working, the area 304 controls the voltage through the driving chip to flip the liquid crystal, transform the lighting area into a high light transmission state, and improve the overall transmittance of the display device.

Figure 4:
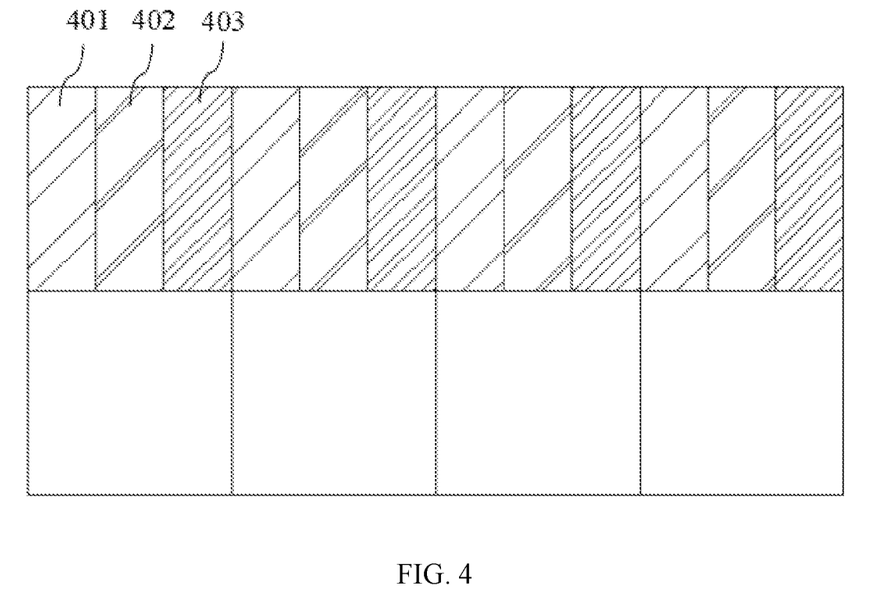
FIG. 4 is a schematic view of arrangement of color resist of a color film substrate corresponding to a lighting area according to second embodiment of the present invention.

Referring to FIG. 4, it is a schematic view of arrangement of color resist of a color film substrate corresponding to a lighting area according to second embodiment of the present invention. The color resist includes a red color resist 401, a green color resist 402, and a blue color resist 403. The color resists of the color filter substrate corresponding to the lighting area are arranged in stripes. The odd rows or even rows are cyclically arranged in order of red color resist, green color resist, and blue color resist. The color of color resist in any column is the same as the color resist directly above it. There is a gap, which is equal to a height of a color resist, between the color resists. That is, a distribution density of the color resist of the color filter substrate corresponding to the lighting area is a half of distribution density of the color resist of the color filter substrate corresponding to the non-lighting area. At this time, the transmittance of the color filter substrate corresponding to the lighting area is A %,*50%+100%*(1-50%), and A is a constant value. The description of this formula is consistent with the formula of FIG. 3a, and is not described here again.

Figure 5:
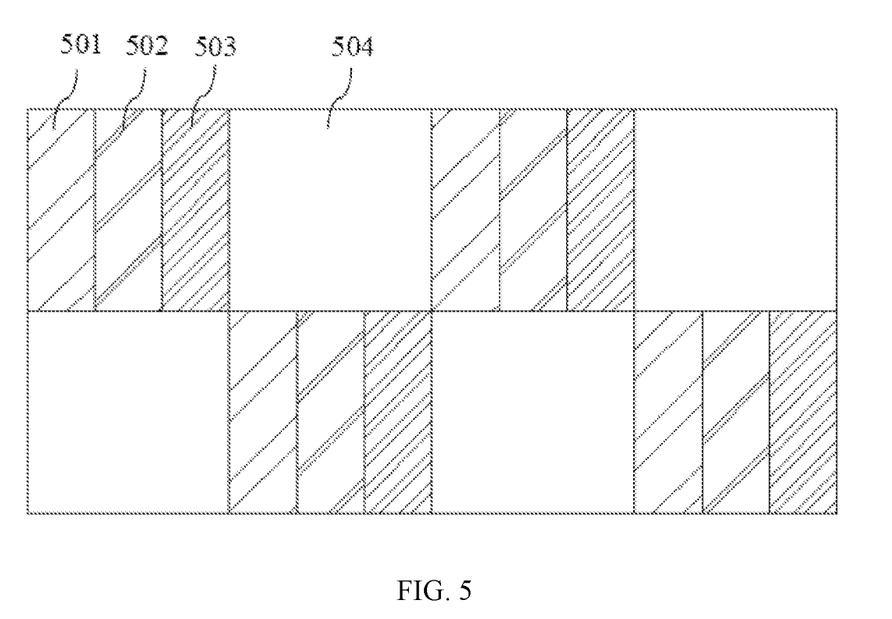
FIG. 5 is a schematic view of arrangement of color resist of a color film substrate corresponding to a lighting area according to third embodiment of the present invention.

Referring to FIG. 5, it is a schematic view of arrangement of color resist of a color film substrate corresponding to a lighting area according to third embodiment of the present invention. The color resist includes a red color resist 501, a green color resist 502, and a blue color resist 503. The color resists of the color filter substrate corresponding to the lighting area are arranged in stripes. The red, green, and blue color resists are the first circulation sub-units. The area 504 excluding the red, green, and blue color resists is the second circulation sub-units located. Any row is arranged cyclically in the order of the first circulation sub-units and the second circulation sub-units. It may also be said that the distance between the first circulation sub-unit and the first circulation sub-unit is the width of three color resists. The color of color resist in any column is the same as the color resist directly above it. There is a gap, which is equal to a height of a color resist, between the color resists. That is, a distribution density of the color resist of the color filter substrate corresponding to the lighting area is a half of distribution density of the color resist of the color filter substrate corresponding to the non-lighting area. At this time, the transmittance of the color filter substrate corresponding to the lighting area is A %,*50%+100%*(1-50%), and A is a constant value. The description of this formula is consistent with the formula of FIG. 3a, and is not described here again.

Figure 6:
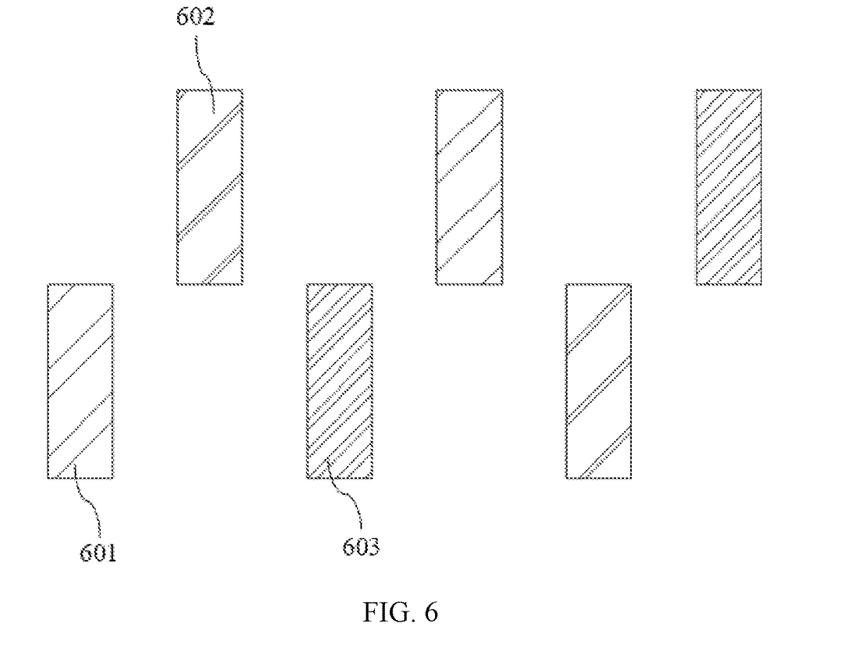
FIG. 6 is a schematic view of arrangement of color resist of a color film substrate corresponding to a lighting area according to fourth embodiment of the present invention.

Referring to FIG. 6, it is a schematic view of arrangement of color resist of a color film substrate corresponding to a lighting area according to fourth embodiment of the present invention. The color resist includes a red color resist 601, a green color resist 602, and a blue color resist 603. The color resists of the color filter substrate corresponding to the lighting area are arranged in stripes. The color in any row is cyclically arranged in the order of green, red, and blue. There is a gap, which is equal to a width of three color resists, between color resists in rows. The color of color resist in any column is the same as the color resist directly above it. There is a gap, which is equal to a height of a color resist, between the color resists in columns. That is, a distribution density of the color resist of the color filter substrate corresponding to the lighting area is a quarter of distribution density of the color resist of the color filter substrate corresponding to the non-lighting area. At this time, the transmittance of the color filter substrate corresponding to the lighting area is A %,*25%+100%*(1-25%), and A is a constant value.

It should be noted that the color resist area accounts for 25% of the entire lighting area, and the other area excluding color resist area accounts for (1-25%) of the entire lighting area. Assuming that the brightness of the backlight is one unit, 25% of the light passes through the area with a transmittance rate of A %, and (1-25%) of the light passes through the area with a transmittance rate of 100%, which excludes color resists. Totally, A %*25%+100%*(1-25%) is the brightness that all lights pass through, and the transmitted brightness/original brightness (1 unit) is the overall transmittance.

Specifically, if A is 70, the transmittance corresponding to the non-lighting area is 70%, and the transmittance corresponding to the lighting area is 70%*25%+100%*(1-25%) is 92.5%, that is to say the overall transmittance of the device is greatly improved.

Figure 7:
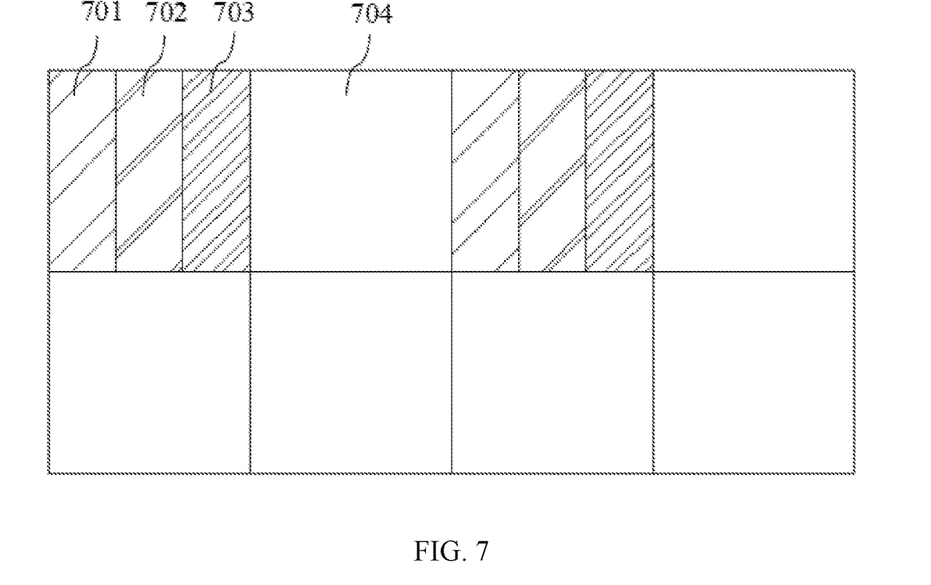
FIG. 7 is a schematic view of arrangement of color resist of a color film substrate corresponding to a lighting area according to fifth embodiment of the present invention.

Referring to FIG. 7, it is a schematic view of arrangement of color resist of a color film substrate corresponding to a lighting area according to fifth embodiment of the present invention.

The color resist includes a red color resist 701, a green color resist 702, and a blue color resist 703. The color resists of the color filter substrate corresponding to the lighting area are arranged in stripes. The red, green, and blue color resists are the first circulation sub-units. The area 704 excluding the red, green, and blue color resists is the second circulation sub-units located. The odd rows or even rows are arranged cyclically in the order of the first circulation sub-units and the second circulation sub-units. It may also be said that the distance between the first circulation sub-unit and the first circulation sub-unit is the width of three color resists. The color of color resist in any column is the same as the color resist directly above it. There is a gap, which is equal to a height of a color resist, between the color resists. That is, a distribution density of the color resist of the color filter substrate corresponding to the lighting area is a half of distribution density of the color resist of the color filter substrate corresponding to the non-lighting area. At this time, the transmittance of the color filter substrate corresponding to the lighting area is A %,*25%+100%*(1-25%), and A is a constant value. The description of this formula is consistent with the formula of FIG. 6, and is not described here again.

Figure 8:
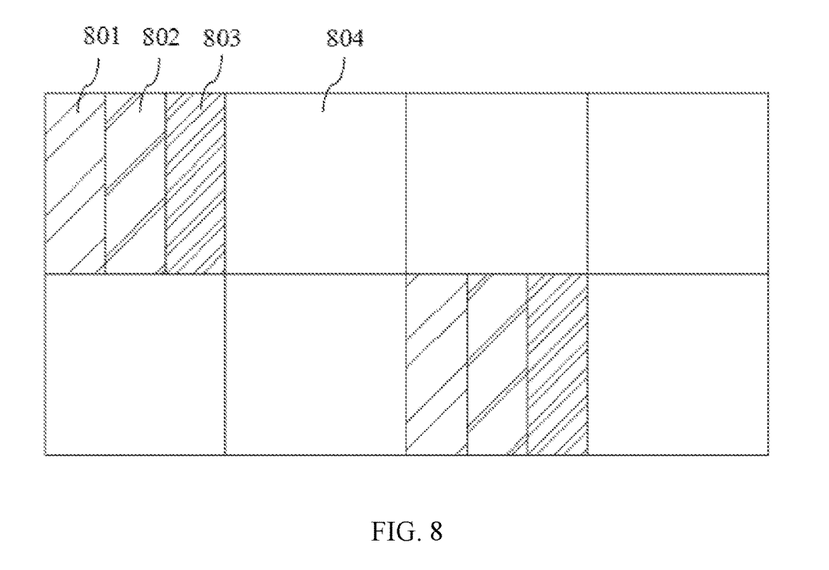
FIG. 8 is a schematic view of arrangement of color resist of a color film substrate corresponding to a lighting area according to sixth embodiment of the present invention.

Referring to FIG. 8, it is a schematic view of arrangement of color resist of a color film substrate corresponding to a lighting area according to sixth embodiment of the present invention. The color resist includes a red color resist 801, a green color resist 802, and a blue color resist 803. The color resists of the color filter substrate corresponding to the lighting area are arranged in stripes. The red, green, and blue color resists are the first circulation sub-units. The area 804 excluding the red, green, and blue color resists is the second circulation sub-units located. Any row is arranged cyclically in the order of the first circulation sub-units and the second circulation sub-units. It may also be said that the distance between the first circulation sub-unit and the first circulation sub-unit is the width of nine color resists. The color of color resist in any column is the same as the color resist directly above it. There is a gap, which is equal to a height of a color resist, between the color resists. That is, a distribution density of the color resist of the color filter substrate corresponding to the lighting area is a quarter of distribution density of the color resist of the color filter substrate corresponding to the non-lighting area. At this time, the transmittance of the color filter substrate corresponding to the lighting area is A %,*25%+100%*(1-25%), and A is a constant value. The description of this formula is consistent with the formula of FIG. 6, and is not described here again.

The present invention also provides one embodiment in which the array substrate and the color filter substrate are improved at the same time, that is, while reducing the width of the opaque metal traces of the array substrate corresponding to the lighting area, reducing the color resist ratio of the color film substrate corresponding to the lighting area. That is, the transmittance of the array substrate and the color filter substrate are increased, and the overall transmittance of the lighting area is improved to meet the lighting requirements of the lighting members.

Figure 9:
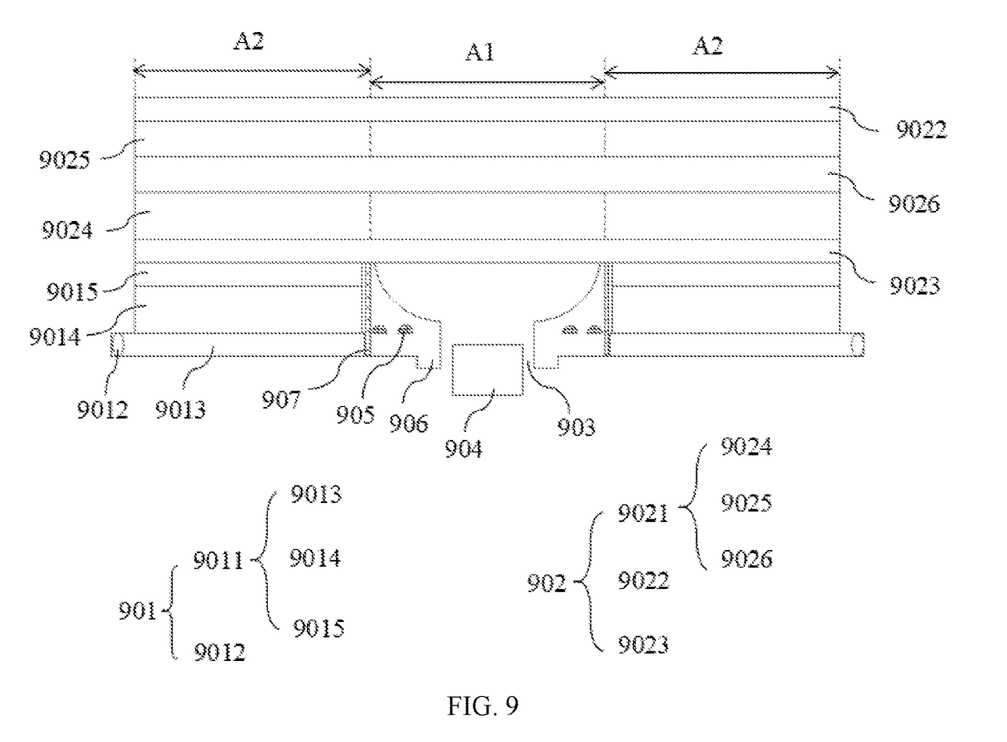
FIG. 9 is schematic structural view of a display device according to another embodiment of the present invention.

Referring to FIG. 9, it is schematic structural view of a display device according to another embodiment of the present invention. It may intuitively see the various components of the present invention and the relative positional relationship between the various components. The display device includes a backlight module 901 and a display module 902 disposed on the backlight module 901. The backlight module 901 is provided with a first via hole 903, and a lighting member 904 is disposed in the first via hole 903, and a maximum cross-section of the first via hole 103 corresponds to a lighting area A1 of the display device. A first light source 905 and a light guide member 906 are further disposed in the lighting area A1, and the first light source 905 and the light guide member 906 surround the lighting member 904. When the lighting member 904 is not working, the first light source 905 is on; when the lighting member 904 is working, the first light source 905 is off, and a transmittance of the lighting area A1 of the display device is greater than a transmittance of the non-lighting area A2 of the display device.

The backlight module 901 includes an optical film group 9011 and a second light source 9012 disposed on the optical film group 9011. The second light source 9012 is located in the non-lighting area A2 of the display device, the optical film group 9011 includes a first optical film 9013, a second optical film 9014 disposed on the first optical film 9013, and a third optical film 9015 disposed on the second optical film 9014. It should be noted that the first optical film 9013, the second optical film 9014, and the third optical film 9015 respectively implement the functions of light reflection, light guiding, and light diffusion.

Specifically, the second light source 9012 is an LED light bar group, and the LED light bar group is disposed on a side of the first optical film 9013 away from the lighting member 904, and a blocking layer 907 is disposed between the optical film group 9011 and the light guide member 906.

It should be noted that, in this embodiment, the backlight of the non-lighting area A2 is implemented by using a conventional side LED strip with a corresponding optical film, and the backlight of the lighting area A1 is still implemented by using a mini LED with a light guide member 906. A blocking layer 907 is added to the outside of the light guiding member 906 in the lighting area A1. The blocking layer 907 is used for blocking light blocking, such as a light blocking optical film (BM), a light blocking coating, etc. It is to prevent the backlight of the non-lighting area A2 (second light source 9012) from affecting the work of the lighting member when the lighting member is working normally. In this embodiment, the conventional LED backlight is used in the non-lighting area A2 to achieve mass production.

In one embodiment, the display module 902 includes a display panel 9021 and an upper polarizer 9022 and a lower polarizer 9023 disposed on both sides of the display panel 9021. The display panel 9021 includes an array substrate 9024 and a color filter substrate 9025, the array substrate 9024 is opposite to a color filter substrate 9025, and a liquid crystal layer 9026 is disposed between the array substrate 9024 and the color filter substrate 9025. The transmittance of the array substrate 9024 and the color filter substrate 9025 are consistent with the embodiments of FIG. 3a to FIG. 8, and are not described here again.

The display device provided in the embodiment of the present invention may be any product or component having a display function such as a mobile phone, a tablet computer, a television, a display, a laptop, a digital camera, a navigator, and the like.

Accordingly, a display device is provided. The lighting device is disposed below the display module, and the display device includes into a lighting area and a non-lighting area according to the corresponding position of the lighting device. When the lighting member is not working, no lighting is required, and the full screen of the display device is displayed normally. When lighting is required, the lighting area is transformed into a high-transmittance state to allow light to pass through so as to achieve lighting. Therefore, the lighting member is working normally, so it achieves a true full-screen display. The technical problem such as the display devices in the prior art sacrifice a part of the screen space or additionally increase the module structure, resulting in higher production costs and lower user experience due to increasing product thickness, is solved.

In the above, the present application has been described in the above preferred embodiments, but the preferred embodiments are not intended to limit the scope of the invention, and a person skilled in the art may make various modifications without departing from the spirit and scope of the application. The scope of the present application is determined by claims.

What is claimed is:

1. A display device, comprising:
a backlight module; and
a display module disposed on the backlight module;
wherein the backlight module is provided with a first via hole, and a lighting member is disposed in the first via hole, and a maximum cross-section of the first via hole corresponds to a lighting area of the display device;
wherein a first light source and a light guide member are further disposed in the lighting area, and the first light source and the light guide member surround the lighting member; and
wherein when the lighting member is not working, the first light source is on; when the lighting member is working, the first light source is off; and a transmittance of the lighting area of the display device is greater than a transmittance of the non-lighting area of the display device.

2. The display device according to claim 1, wherein the display module comprises a display panel and an upper polarizer and a lower polarizer disposed on both sides of the display panel, the display panel comprises an array substrate and a color filter substrate, the array substrate is opposite to a color filter substrate, and a liquid crystal layer is disposed between the array substrate and the color filter substrate.

3. The display device according to claim 2, wherein a width of metal trace of the array substrate corresponding to the lighting area is less than a width of metal trace of the array substrate corresponding to the non-lighting area.

4. The display device according to claim 2, wherein a space of metal trace of the array substrate corresponding to the lighting area is greater than a space of metal trace of the array substrate corresponding to the non-lighting area.

5. The display device according to claim 2, wherein a width of black matrix of the array substrate corresponding to the lighting area is less than a width of black matrix of the array substrate corresponding to the non-lighting area.

6. The display device according to claim 2, wherein a space of black matrix of the array substrate corresponding to the lighting area is greater than a space of black matrix of the array substrate corresponding to the non-lighting area.

7. The display device according to claim 2, wherein a distribution density of thin film transistors of the array substrate corresponding to the lighting area is less than a distribution density of thin film transistors of the array substrate corresponding to the non-lighting area.

8. The display device according to claim 2, wherein a distribution density of color resist of the color filter substrate corresponding to the lighting area is less than a distribution density of color resist of the color filter substrate corresponding to the non-lighting area.

9. The display device according to claim 8, wherein a distribution density of thin film transistors of the array substrate corresponding to the lighting area is equal to a distribution density of thin film transistors of the array substrate corresponding to the non-lighting area.

10. The display device according to claim 8, wherein a distribution density of the color resist of the color filter substrate corresponding to the lighting area is a half or a quarter of a distribution density of the color resist of the color filter substrate corresponding to the non-lighting area.

11. The display device according to claim 2, wherein the color filter substrate corresponding to the lighting area does not have a color resist, and a first light source is consisted of a red mini light emitting diode (LED), a green mini LED, and a blue mini LED.

12. The display device according to claim 1, wherein the backlight module comprises an optical film group and a second light source disposed on the optical film group, the second light source is located in the non-lighting area of the display device, and the optical film group comprises a first optical film, a second optical film disposed on the first optical film, and a third optical film disposed on the second optical film.

13. The display device according to claim 12, wherein the second light source is a mini LED group, and the mini LED group is disposed between the first optical film and the second optical film.

14. The display device according to claim 12, wherein the second light source is an LED light bar group, and the LED light bar group is disposed on a side of the first optical film away from the lighting member, and a blocking layer is disposed between the optical film group and the light guide member.

* * * * *